Figure 1:
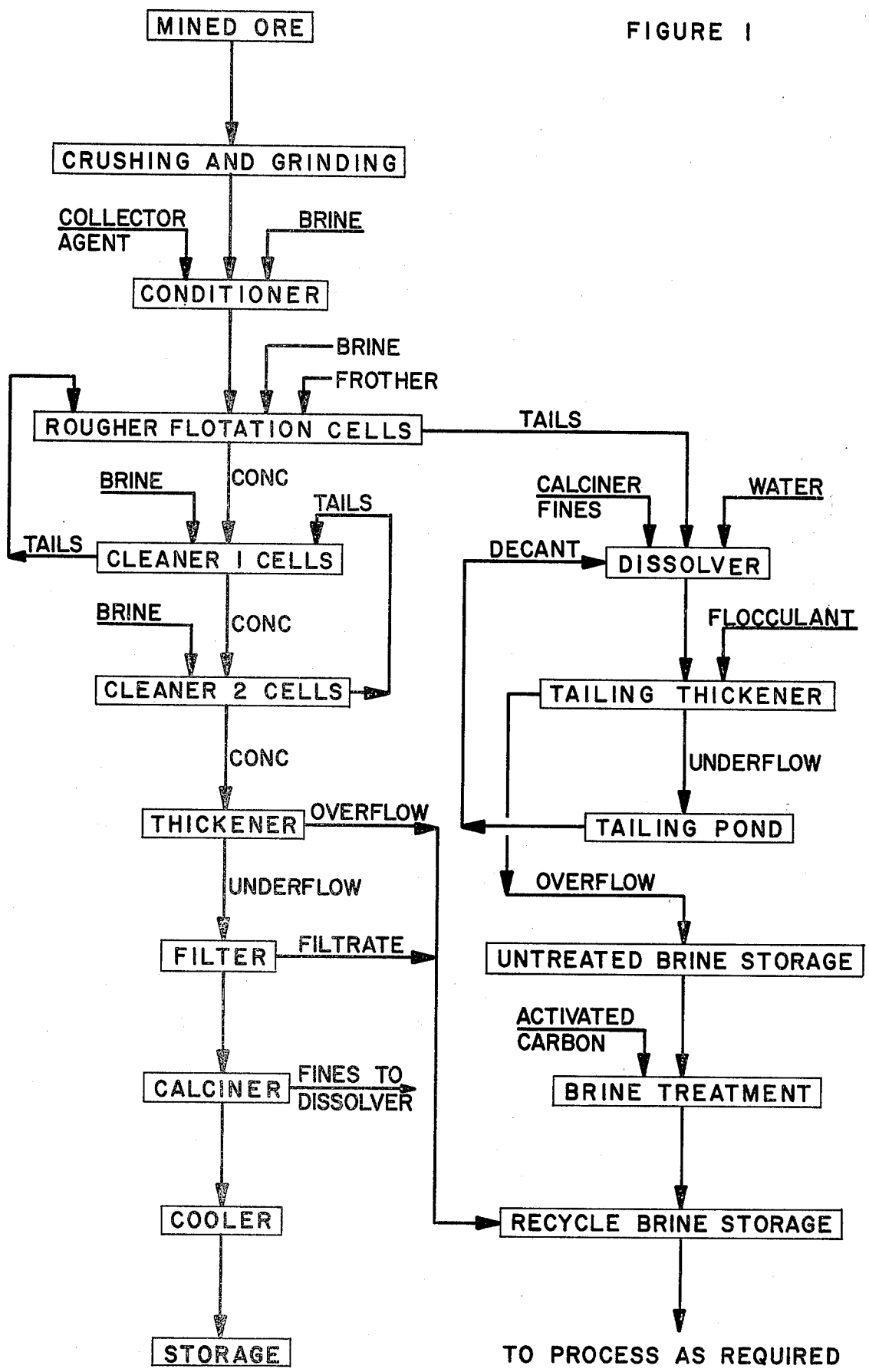

United States Patent [19]

Brison et al.

[11] 4,283,277
[45] Aug. 11, 1981

[54] BENEFICIATION OF TRONA BY FLOTATION

[75] Inventors: Robert J. Brison; John C. Gathje, both of Arvada, Colo.

[73] Assignee: Stauffer Chemical Company, Westport, Conn.

[21] Appl. No.: 34,527

[22] Filed: Apr. 30, 1979

[51] Int. Cl.³ .............................................. B03D 1/02
[52] U.S. Cl. ....................................... 209/166; 209/10
[58] Field of Search .................... 209/166, 167; 55/73; 23/293 S

[56] References Cited

U.S. PATENT DOCUMENTS

| | | | |
|---|---|---|---|
| 2,211,396 | 8/1940 | Weinig | 209/166 X |
| 2,385,527 | 9/1945 | Menefee | 23/293 S |
| 2,834,430 | 5/1958 | Johnson | 55/73 |
| 2,839,192 | 6/1958 | Monson | 209/166 |
| 3,525,434 | 8/1970 | Garrett | 209/166 |
| 3,973,734 | 8/1976 | Rosan | 209/166 |
| 4,110,207 | 8/1978 | Wang | 209/166 |
| 4,139,481 | 2/1979 | Wang | 209/166 X |

*Primary Examiner*—Robert Halper
*Attorney, Agent, or Firm*—Edwin H. Baker

[57] ABSTRACT

A froth flotation method for the separation of trona from ground trona ore slurried in a saturated brine solution of sodium carbonate and sodium bicarbonate by using organic compounds of a specified type as flotation collectors.

6 Claims, 1 Drawing Figure

BENEFICIATION OF TRONA BY FLOTATION

BACKGROUND OF THE INVENTION

Trona is a naturally occurring ore found in the area of Green River, Wyoming and Kenya, Africa. Crude trona, for example, from the state of Wyoming consists of about 90% sodium sesquicarbonate $$NaCO_3.NaHCO_3.2H_2O.$$

The major impurities occur in the irregular seams which are commonly termed "oil shale", more accurately these can be described as marlstone rich in organic matter, approximately 4% of the ore as mined is the mineral shortite, $$NaCO_3.2CaCO_3$$

which is relatively insoluble in water and is always associated with the oil shale. The crude ore also contains organic matter which is found in the sodium sesquicarbonate and oil shale. Iron, present mostly, as pyrite, vanadium, chromium and other heavy metals are also present as minor impurities, mixed with about 4% to 6% insoluble impurities which are largely silicates and contains small amounts of iron, sulfates, chlorides, etc. A typical reported trona analysis is 45.11% $Na_2CO_3$, 35.75% $NaHCO_3$, 15.32% water, 0.03% NaCl, 0.01% $Na_2SO_4$, 0.11% $Fe_2O_3$ and 3.75% insolubles. However, the analysis will differ depending upon the location in the mine from which the trona is removed, some portions carrying larger or smaller percentages of insolubles and other impurities.

Two basic processes have been used commercially in the processing of the ore.

One process dissolves the sesquicarbonate as such, treats the solution to remove insolubles and organic matter, and then crystallizes sodium sesquicarbonate which may be used as such or calcined to soda ash. The resultant soda ash is pseudomorphic in form after the crystal pattern of the sodium sesquicarbonate, and special additives are needed to get desirable crystal properties. Moreover, the crystal structure is different from that obtained by the conventional Solvay process, so that the product is sometimes difficult to substitute for conventional Solvay process soda ash. Processes of this type are disclosed in U.S. Pat. Nos. 2,346,140; 2,639,217; 2,798,790 and 3,028,215.

The second basic process for handling natural trona, the so-called monohydrate process, produces a product which is like Solvay process soda ash. In this process, the trona is first calcined to crude soda ash; the ash is dissolved, and the solution treated to remove insolubles. The resultant solution is crystallized to produce sodium carbonate monohydrate crystals, which are then treated to remove the water of hydration and produce soda ash. Process of this type are disclosed in U.S. Pat. Nos. 2,343,080; 2,343,081; 2,962,348; 3,131,996 and 3,260,567.

Each of these processing techniques involves dissolution, clarification, filtration and crystallization, with relatively high energy consumption, adding substantially to the cost of the final product.

Accordingly, it is an object of the present invention to provide a relatively simple and inexpensive process for the production of soda ash from trona ore.

It has now been discovered that trona can be effectively beneficiated by froth flotation using organic compounds of a specified type as flotation collectors.

A flowsheet for the flotation of trona is shown in FIG. 1. The mined ore is crushed and ground to minus 30-mesh. The grinding may be either wet or dry. The nominal size range of commercial soda ash is typically 30×140 mesh. Several options are available for handling the minus 140 mesh fines. They may be removed from the process prior to flotation; they may remain in the process and be removed and agglomerated after flotation; or they may remain in the product to be sold "as is".

After grinding, the trona ore is slurried in a saturated brine solution of sodium carbonate and sodium bicarbonate and mixed with the collector agent in a conditioner. The trona is then floated in a rougher flotation stage and cleaned in two additional stages. The cleaner tails are pumped back to the feed end of the preceding stage. The froth product in each case should preferably flow by gravity to the following stage to minimize size degradation by pumping. A small amount of frother is added to the flotation section.

The final flotation concentrate is pumped to a thickener to partially debrine the concentrate. The thickener underflow is either filtered or centrifuged, then calcined, and cooled.

Nearly all of the brine is recycled. However, some brine leaves the flotation system via the filtered concentrate and the tailings. The only unrecoverable brine is that which is retained in the tailing pond with the settled solids.

The make-up brine for the flotation system is prepared by agitating the flotation tailing, calcined fines, tailing pond decant, and water in a dissolving tank. The brine preferably contains approximately 18 grams (g) $Na_2CO_3$ and approximately 4 g $NaHCO_3$ per 100 g brine. The dissolving tank overflows to the tailing thickener. Flocculant may be added to aid the separation in the thickener. The thickener underflow is discharged to the tailing pond and the overflow is sent to the untreated brine storage tank. Brine from this tank is treated with activated carbon to remove organics resulting from the dissolution step, then transferred to the recycle brine storage tank. The concentrate thickener overflow and filtrate is also added to this tank which supplies brine to the process.

Generally, the method of this invention for the froth flotation separation of trona from ground trona ore slurried in a saturated brine solution of sodium carbonate and sodium bicarbonate comprises floating the trona from the slurry using as a flotation collector an organic compound which contains the following essential constituents:

(a) At least one non-polar hydrocarbon group containing a total of at least 10 carbon atoms;

(b) At least one polar carboxyl group,

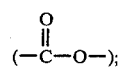

and (c) At least one oxo radical (O=) which is bonded to a carbon atom that is separated from the carbon atom of a carboxyl group by 1, 2 or 3 carbon atoms, a nitrogen and 1 carbon atom or a nitrogen and 2 carbon atoms, the remaining bond of said nitrogen atom being substituted by either hydrogen or lower alkyl.

Compounds of the specified type include, for example, those having the structural formulas:

| Compound Number | |
|---|---|
| 1 | $$\begin{array}{c} CH_2-C{\overset{\displaystyle O}{\underset{\displaystyle \diagdown ONa}{\diagup}}} \\ | \\ CH-C{\overset{\displaystyle O}{\underset{\displaystyle \diagdown ONa}{\diagup}}} \end{array}$$ |
| | $$C_{18}H_{37}-N-\overset{O}{\underset{\|}{C}}-CH_2-\overset{SO_2Na}{\underset{\|}{CH}}-\overset{O}{\underset{\|}{C}}ONa$$ |
| 2 | $$C_{18}H_{37}-\overset{H}{\underset{\|}{N}}-\overset{O}{\underset{\|}{C}}-CH_2-\overset{SO_2Na}{\underset{\|}{CH}}-\overset{O}{\underset{\|}{C}}ONa$$ |
| 3 | $$C_{14}H_{29}-\overset{H}{\underset{\|}{C}}=\overset{H}{\underset{\|}{C}}-\overset{\overset{O}{\|}}{\underset{\|}{COH}}-CH_2-\overset{O}{\underset{\|}{C}}OH$$ |
| 4 | $$C_{11}H_{23}-\overset{O}{\underset{\|}{C}}-\overset{CH_3}{\underset{\|}{N}}-CH_2-\overset{O}{\underset{\|}{C}}-OH$$ |
| 5 | $$C_{17}H_{35}-\overset{O}{\underset{\|}{C}}-\overset{CH_3}{\underset{\|}{N}}-CH_2-\overset{O}{\underset{\|}{C}}-OH$$ |
| 6 | $$C_{12}H_{25}-O-\overset{O}{\underset{\|}{C}}-CH_2-CH_2-\overset{O}{\underset{\|}{C}}-OH$$ |

FLOTATION TESTS

Trona ore from the area of Green River, Wyoming was crushed to approximately minus six mesh. A 500 g sample of this crushed ore was wet ground in a laboratory rod mill (8" long × 8" diameter) for 1 to 2 minutes. During this wet grinding operation, a saturated solution derived from trona ore and having organic material removed was used as the flotation medium.

Next during the conditioning stage, the 500 g sample of the wet ground ore was placed in a Wemco ® laboratory flotation cell, size 600 g. The conditioning consisted of adding a collector agent to the wet ground ore sample and then mixing the treated sample by running the rotor of the flotation cell at about 900 r.p.m. for about 3 to 9 minutes at ambient temperature without air being introduced into the sample. During the last 10 seconds of this conditioning, a small amount of a frother agent, such as Dowfroth ® 250, was added to the sample.

Next during the flotation stage, the flotation cell was run with air being introduced into the sample.

The introduced air rises through the pulp to the top surface to form a froth. Trona treated with an operative collector agent attaches itself to the rising air bubbles and rises to the top of the cell. The trona then overflows or is skimmed from the top surface as froth into a collecting vessel. The flotation stage was run until a nonmineralized froth was obtained generally from 5 to 10 minutes and on the average about 8 minutes.

Next, the floated trona ore was debrined and weighed and the percent recovery of this rough froth and the overall weight percent collected were calculated. This overall weight percent collected for various collector agents is reported in Table I. Generally, greater amounts of collector agent increase the percent recovery.

Additionally, the acid-insoluble content of the products was ascertained by determining what weight percent of the materials was insoluble in dilute hydrochloric acid (13.6% HCl by volume). The mineral shortite, which is water-insoluble, is not considered an undesirable impurity in the floated trona product. Therefore, the acid-insolubility determination was selected as a main basis for evaluation. The percentage of the total acid-insoluble material collected in the trona concentrate is also reported in Table I for the collector agent.

Generally, higher overall weight percent recovery in the rougher froth and lower recovery of acid-insoluble material in the froth indicate higher efficiency for the collector agent.

The recovery of acid-insoluble material in the froth is substantially further reduced by two flotation cleaning stages.

Iron was found to be removed by the flotation method in approximately the same percentage as acid-insoluble material.

TABLE I
TESTING OF TRONA FLOTATION AGENTS

| | | Recovery in Rougher Froth | |
|---|---|---|---|
| Compound Number | Amount Lbs./Ton | Overall Wt. (%) | Acid Insol. (%) |
| 1 | 3.0 | 61.3 | 34.6 |
| 2 | 4.0 | 92.3 | 35.1 |
| 3 | 2.0 | 90.1 | 36.6 |
| 4 | 2.0 | 73.4 | 37.3 |
| 5 | 2.0 | 83.0 | 32.2 |
| 6 | 1.0 | 70.6 | 39.5 |
| * | 0.0 | 8.2 | 14.5 |

*Solution without a flotation agent.

What is claimed:

1. A method for the froth flotation separation of trona from ground trona ore slurried in a saturated brine solution of sodium carbonate and sodium bicarbonate comprising flotating the trona from the slurry using as the flotation collector a compound having the structural formula

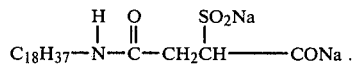

2. A method for the froth flotation separation of trona from ground trona ore slurried in a saturated brine solution of sodium carbonate and sodium bicarbonate comprising flotating the trona from the slurry using as the flotation collector a compound having the structural formula

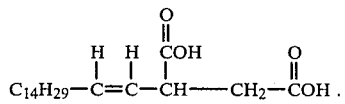

3. A method for the froth flotation separation of trona from ground trona ore slurried in a saturated brine solution of sodium carbonate and sodium bicarbonate comprising flotating the trona from the slurry using as the flotation collector a compound having the structural formula

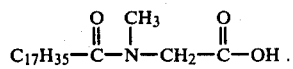

4. A method for the froth flotation separation of trona from ground trona ore slurried in a saturated brine solution of sodium carbonate and sodium bicarbonate comprising flotating the trona from the slurry using as the flotation collector a compound having the structural formula

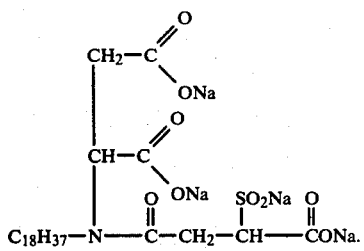

5. A method for the froth flotation separation of trona from ground trona ore slurried in a saturated brine solution of sodium carbonate and sodium bicarbonate comprising flotating the trona from the slurry using as the flotation collector a compound having the structural formula

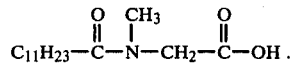

6. A method for the froth flotation separation of trona from ground trona ore slurried in a saturated brine solution of sodium carbonate and sodium bicarbonate comprising flotating the trona from the slurry using as the flotation collector a compound having the structural formula

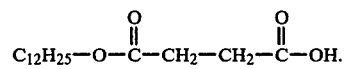

* * * * *